(12) United States Patent
Couasnon

(10) Patent No.: US 9,834,116 B2
(45) Date of Patent: Dec. 5, 2017

(54) SYSTEM COMPRISING A SLIDE TRACK FOR MOTOR VEHICLE SEAT AND A SUPPORT INTENDED FOR ATTACHMENT THERETO

(71) Applicant: Faurecia Sièges d'Automobile, Nanterre (FR)

(72) Inventor: Christian Couasnon, Flers (FR)

(73) Assignee: Faurecia Sièges d'Automobile, Nanterre (FR)

( * ) Notice: Subject to any disclaimer, the term of this patent is extended or adjusted under 35 U.S.C. 154(b) by 68 days.

(21) Appl. No.: 14/952,658

(22) Filed: Nov. 25, 2015

(65) Prior Publication Data
US 2016/0144746 A1 May 26, 2016

(30) Foreign Application Priority Data

Nov. 26, 2014 (FR) ..................................... 14 61509

(51) Int. Cl.
*F16M 13/00* (2006.01)
*B60N 2/07* (2006.01)

(52) U.S. Cl.
CPC ......... *B60N 2/0722* (2013.01); *B60N 2/0705* (2013.01); *B60N 2/0732* (2013.01)

(58) Field of Classification Search
USPC ........................................................ 248/429
See application file for complete search history.

(56) References Cited

U.S. PATENT DOCUMENTS

| 4,804,229 | A | * | 2/1989 | Nishino | B60N 2/0705 248/430 |
| 4,964,608 | A | * | 10/1990 | Rogala | B60N 2/0705 248/429 |
| 5,772,173 | A | * | 6/1998 | Couasnon | B60N 2/0705 248/430 |
| 6,371,558 | B1 | * | 4/2002 | Couasnon | B60N 2/0705 297/340 |
| 6,422,526 | B1 | * | 7/2002 | Ishikawa | B60N 2/071 248/430 |

(Continued)

FOREIGN PATENT DOCUMENTS

| CN | 1475384 A | 2/2004 |
| CN | 101505995 A | 8/2009 |

(Continued)

OTHER PUBLICATIONS

French Search Report and Written Opinion corresponding to FR application No. 1461509, dated Nov. 26, 2014, 6 pages, not translated.

(Continued)

*Primary Examiner* — Monica Millner
(74) *Attorney, Agent, or Firm* — Reising Ethington P.C.

(57) ABSTRACT

System comprising a slide track for motor vehicle seat and a support. The slide track comprises a fixed rail and a movable rail which has an inner surface, an outer surface, and a through-window. The support comprises a body having a contact surface attached to the outer surface of the movable rail, and a tongue extending from the body to pass through the window of the movable rail and be attached to the inner surface of the movable rail. The tongue has a maximum extension into the hollow interior space E that is less than or equal to a thickness of the tongue.

12 Claims, 5 Drawing Sheets

(56) References Cited

U.S. PATENT DOCUMENTS

| | | | | |
|---|---|---|---|---|
| 6,588,722 B2* | 7/2003 | Eguchi | ............... | B60N 2/01591 |
| | | | | 248/298.1 |
| 6,874,746 B2 | 4/2005 | Ganot | | |
| 6,886,797 B2* | 5/2005 | McCullen | ............... | B60N 2/071 |
| | | | | 248/424 |
| 7,316,442 B2* | 1/2008 | Jung | ............... | B60N 2/0715 |
| | | | | 248/430 |
| 7,475,861 B2* | 1/2009 | Chung | ............... | B60N 2/0705 |
| | | | | 248/429 |
| 8,075,039 B2* | 12/2011 | Rohee | ............... | B60N 2/0732 |
| | | | | 248/429 |
| 8,196,888 B2* | 6/2012 | Yamada | ............... | B60N 2/0705 |
| | | | | 248/423 |
| 8,256,822 B2* | 9/2012 | Koga | ............... | B60N 2/0232 |
| | | | | 248/429 |
| 8,925,889 B2* | 1/2015 | Nagura | ............... | B60N 2/0705 |
| | | | | 248/424 |
| 9,108,534 B2 | 8/2015 | Hoshi et al. | | |
| 9,216,666 B2* | 12/2015 | Suess | ............... | B21D 53/88 |
| 2004/0232303 A1 | 11/2004 | Rausch et al. | | |
| 2004/0232750 A1* | 11/2004 | Rohee | ............... | B60N 2/08 |
| | | | | 297/334 |
| 2006/0226328 A1* | 10/2006 | Matsumoto | ............ | B60N 2/0705 |
| | | | | 248/429 |
| 2008/0238127 A1* | 10/2008 | Kojima | ............... | B60N 2/0705 |
| | | | | 296/65.13 |
| 2009/0051208 A1* | 2/2009 | Szybisty | ............... | B60N 2/0705 |
| | | | | 297/463.1 |
| 2010/0327139 A1* | 12/2010 | Wojatzki | ............... | B60N 2/0705 |
| | | | | 248/429 |
| 2011/0278875 A1* | 11/2011 | Couasnon | ............... | B60N 2/067 |
| | | | | 296/65.13 |
| 2012/0199719 A1* | 8/2012 | Yamada | ............... | B60N 2/0705 |
| | | | | 248/430 |
| 2012/0256074 A1* | 10/2012 | Garotte | ............... | B60N 2/073 |
| | | | | 248/429 |
| 2013/0292539 A1 | 11/2013 | Speck et al. | | |
| 2014/0110554 A1* | 4/2014 | Oya | ............... | B60N 2/0705 |
| | | | | 248/430 |
| 2015/0090854 A1* | 4/2015 | Hayashi | ............... | B60N 2/0705 |
| | | | | 248/429 |

FOREIGN PATENT DOCUMENTS

| | | |
|---|---|---|
| CN | 103180167 A | 6/2013 |
| DE | 19858846 C2 | 4/2003 |
| DE | 102010042008 A1 | 4/2012 |
| DE | 102012208447 A | 11/2013 |
| EP | 2586648 A1 | 5/2013 |
| FR | 2879138 A1 | 6/2006 |
| FR | 2981617 A1 | 4/2013 |

OTHER PUBLICATIONS

English summary of Chinese Office Action for CN application No. 201510838170.1, dated Jun. 27, 2017, 8 pages.

* cited by examiner

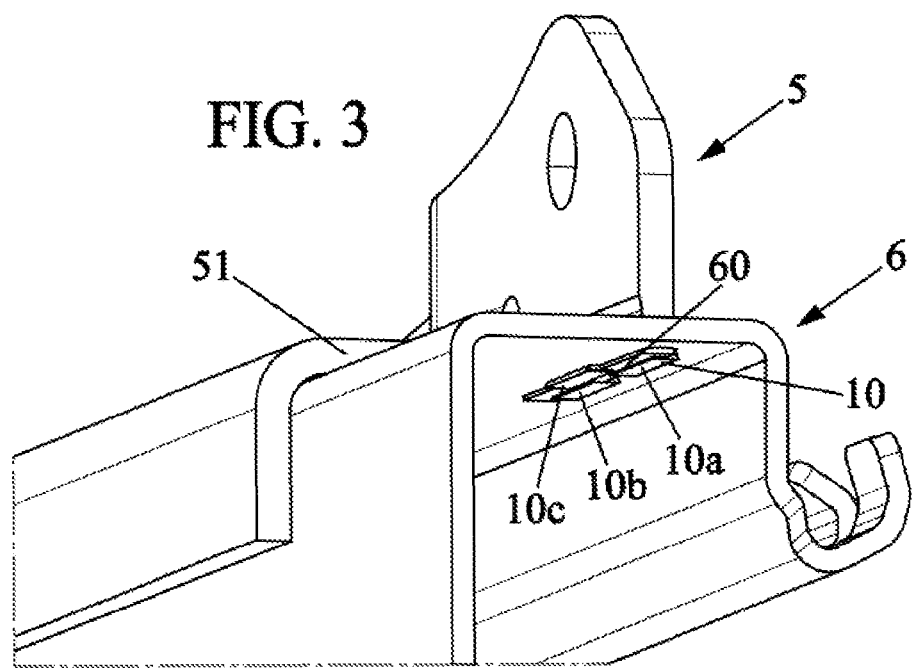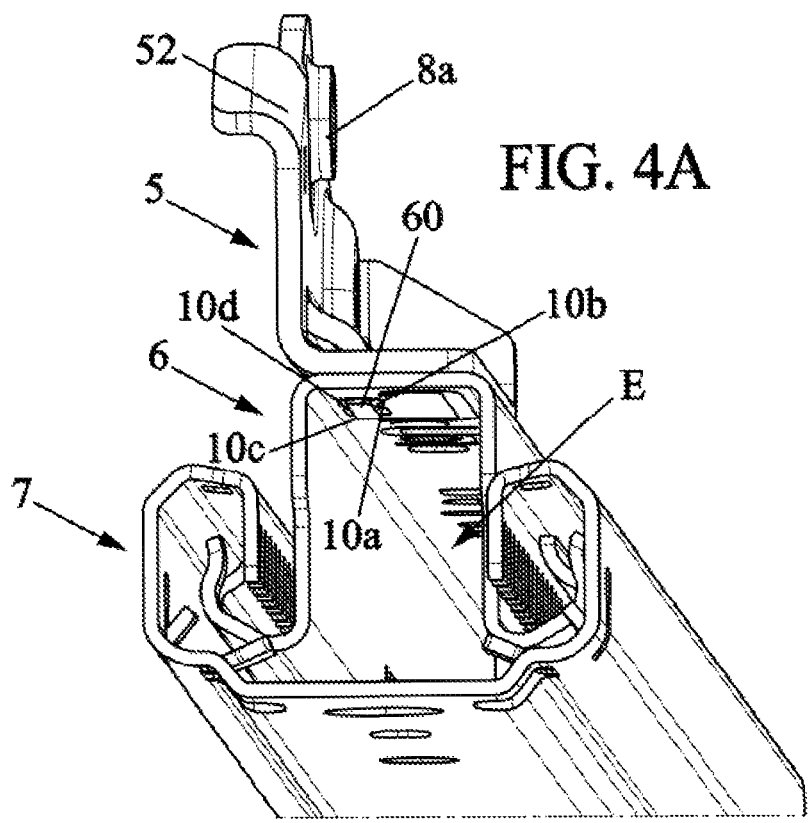

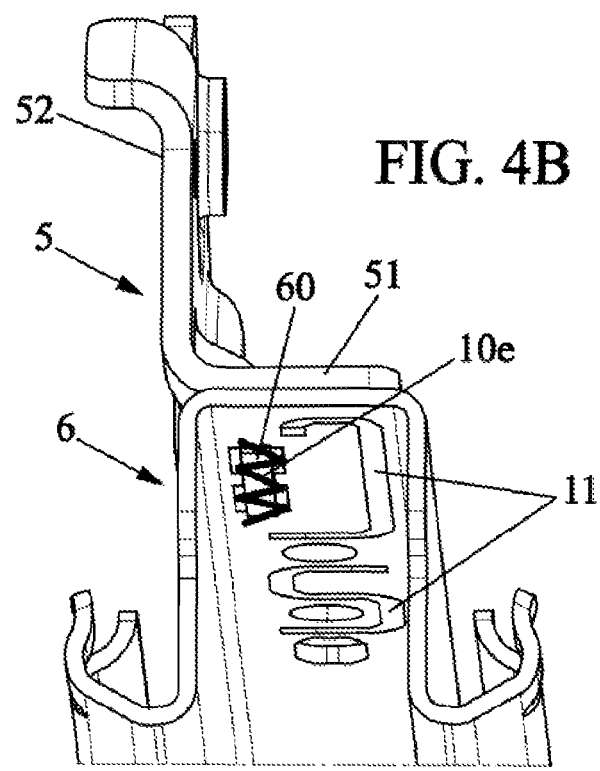
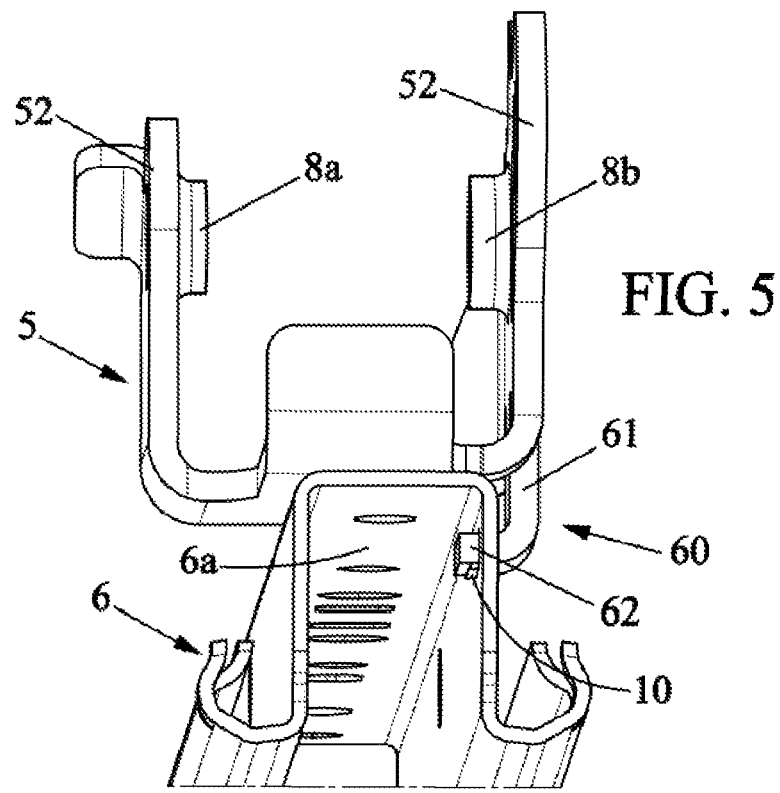

SYSTEM COMPRISING A SLIDE TRACK FOR MOTOR VEHICLE SEAT AND A SUPPORT INTENDED FOR ATTACHMENT THERETO

TECHNICAL FIELD

The invention relates to systems comprising a slide track for motor vehicle seat and a support intended for attachment thereto.

BACKGROUND

More particularly, the invention relates to a system comprising a slide track for motor vehicle seat and a support, the slide track comprising a fixed rail intended to be mounted on the chassis of the motor vehicle, and a movable rail adapted to slide relative to the fixed rail in a longitudinal direction, the movable rail having an inner surface defining a portion of a hollow interior space E arranged between the movable rail and the fixed rail, an outer surface separated from the inner surface by the thickness of the wall of the movable rail, and a through-window, the support comprising a body having a contact surface extending in a substantially horizontal plane and attached to the outer surface of the movable rail, and a tongue extending from the body to pass through the window of the movable rail and be attached to the inner surface of the movable rail.

Document FR 2 981 617 describes an example of such a system. In this document, the tongue is made by cutting out an area of the contact surface, folding it, and extending it through the opening so that it can be attached, flat, to the inner surface of a lateral flange of the rail. Such a system offers an inexpensive solution to the problem of secure attachment of a component to the vehicle chassis.

However, in some applications of the system, for example in the case of motorized slide tracks, flat attachment of the tongue to the inner surface of the lateral flange of the rail can interfere with a displacement mechanism housed within said slide track.

An object of the invention is to improve the situation.

SUMMARY

For this purpose, according to one aspect of the invention, a system of the kind in question is characterized in that the tongue has a maximum extension into the hollow interior space, measured in a plane perpendicular to the longitudinal direction, that is less than or equal to a thickness of the tongue measured in a plane perpendicular to the longitudinal direction.

As detailed below, with this arrangement it is possible to install a motorized track mechanism inside the rail.

In some embodiments of the invention, one or more of the following arrangements may possibly be used:
- the body of the support comprises at least one lateral flange extending substantially in a vertical plane from the contact surface, and the tongue extends from said at least one lateral flange of the body;
- the tongue extends from said at least one lateral flange of the body in a first portion extending substantially in the vertical plane;
- the tongue terminates in an end portion extending substantially in the horizontal plane;
- the tongue is attached to the inner surface of the movable rail by at least one laser welding bead overlapping the tongue and the inner surface of the movable rail;
- the tongue extends between two main extension faces separated by the thickness of the tongue, and said at least one laser welding bead covers at least a portion of a main extension face of the tongue;
- the tongue extends between two main extension faces separated by the thickness of the tongue, and terminates in at least one end face connecting the two main extension faces, and said at least one laser welding bead covers at least a portion of the end face of the tongue;
- the end face of the tongue is respectively connected to the two main extension faces by two respective end edges, and at least two laser welding beads overlap the tongue and the inner surface of the movable rail and respectively cover at least a portion of each respective end edge;
- the welding bead is a zig-zag welding bead extending in the longitudinal direction and in a second direction perpendicular to the longitudinal direction and completely traversing the end face in the second direction so as to cover respective portions of the inner surface of the movable rail which are arranged one on either side of the window in said second direction;
- the movable rail comprises a base extending along the horizontal plane, with two lateral flanges one on either side of the base, and the window is formed in an edge connecting a lateral flange of the movable rail to the base of the movable rail;
- the window formed in said edge connecting a lateral flange of the movable rail to the base of the movable rail is at least partially defined by a tab extending from the lateral flange through the window as an extension of said lateral flange, and the tongue is attached to said extending tab.

Another object of the invention is a motor vehicle seat comprising a system as described above.

With the arrangements provided by certain of these embodiments, it is possible to adjust the transverse position of the support relative to the slide track within a certain range during assembly, the tongue of the support is attached in a simple manner to the inner face of the movable rail, the welding bead connecting the tongue to the movable rail is inexpensive and easy to create, the support is easily installed on the movable rail, there is absolutely no entry of the tongue into the hollow interior space, and the tongue does not interfere with any mechanism inside the hollow interior space.

Other features and advantages of the invention will be apparent from the following description of one of its embodiments, given by way of non-limiting example, with reference to the accompanying drawings.

BRIEF DESCRIPTION OF THE DRAWINGS

In the drawings:

FIG. 3 is a perspective view of the system of FIG. 2, FIGS. 4A and 4B illustrate two variant embodiments of the system of FIG. 3, FIG. 5 is a perspective view of a system according to a second embodiment of the invention.

DETAILED DESCRIPTION

In the various figures, the same references designate identical or similar elements.

It should be noted that in the figures, structural and/or functional elements common to the various embodiments may have the same references. Therefore, unless otherwise indicated, such elements have identical structural, dimensional, and material properties.

For clarity, only those elements useful to understanding the described embodiments have been represented and will be detailed.

In the following description, when reference is made to qualifiers relating to absolute position, such as the terms 'front', 'rear', 'top', 'bottom', 'left', 'right', etc., or to relative position, such as the terms 'above', 'below', 'upper', 'lower', etc., or orientation qualifiers, these are relative to a seat in a normal usage position in the ordinary direction of advancement of the vehicle.

Figure 1:
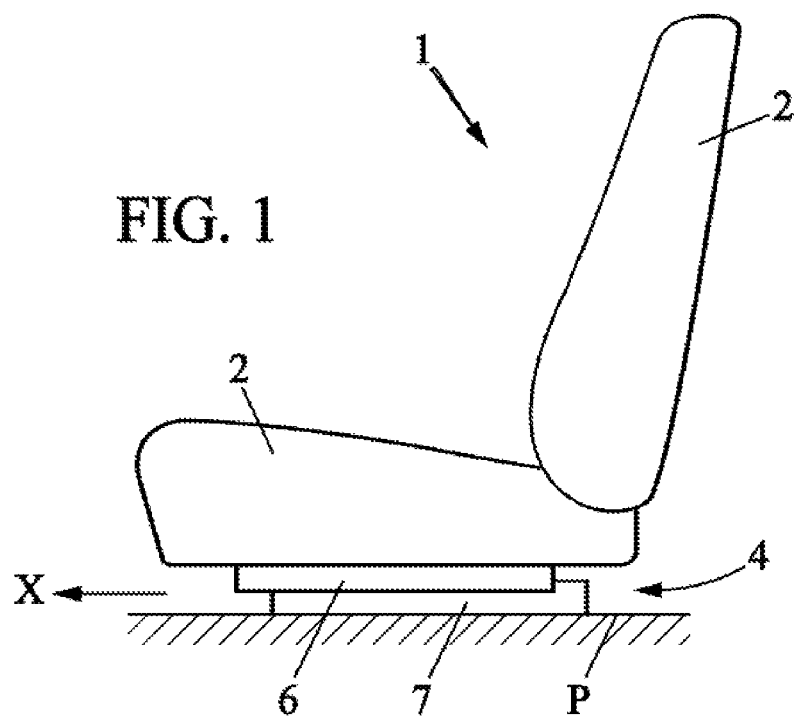
FIG. 1 is a schematic view of one side of a motor vehicle seat.

FIG. 1 shows a highly schematic representation of a motor vehicle seat 1 comprising a backrest 2 and a seating part 3 on which for example the backrest 2 can be mounted. The seating part 3 is mounted on the floor P of the chassis of the motor vehicle via one or more slide tracks 4 (for example two lateral slide tracks) respectively extending in a longitudinal direction X.

The slide tracks 4 allow adjusting the position of the seat 1 relative to the floor P, by translation in the longitudinal direction X, especially in a first direction X1 (backwards in the current case) and in a second direction X2 that is opposite the first direction X1 (forward in the current case).

In addition, a transverse direction Y is defined as being perpendicular to the longitudinal direction X. More specifically, the transverse direction Y and the longitudinal direction X may for example substantially lie in a substantially horizontal plane that is an extension of the vehicle floor P.

The slide tracks 4 usually comprise a fixed rail 7 which is mounted, generally in a fixed manner, on the floor P of the motor vehicle, and a movable rail 6 to which is fastened the seating part 3 of the seat by means detailed below. The movable rail 6 and the fixed rail 7 have their largest dimensions in the longitudinal direction X.

The fixed rail 7 and the movable rail 6 have complementary shapes allowing the movable rail 6 to slide relative to the fixed rail in the longitudinal direction X, so as to adjust the longitudinal position of the seat 1 within the passenger compartment of the motor vehicle.

The seating part 3 generally comprises a rigid metal frame (not shown) comprising two lateral arms at a distance apart, extending in the longitudinal direction X of the seating part and interconnected by cross members. The seating part is usually attached to the movable rail by engagement between these lateral arms and a support 5 which is itself attached to the movable rail 6 of the track 4.

The seat is thus attached to the floor P of the vehicle by a system formed by the slide tracks 4 and the supports 5.

The cross-section of the movable rail 6 has the general shape of an inverted U and the cross-section of the fixed rail 7 has the general shape of U, such that the fixed rail 7 and the movable rail 6 fit into one another, the movable rail 6 having for example a male profile and the fixed rail 7 having a female profile.

In this arrangement, the fixed rail 7 and the movable rail 6 define between them a hollow interior space E.

Specifically, the fixed rail 7 and the movable rail 6 each have an inner surface 6a, 7a and an outer surface 6b, 7b respectively separated from each other by the thickness of the wall of the movable rail 6 and fixed rail 7 respectively.

The inner surfaces 6a, 7a of the fixed rail 7 and movable rail 6 delimit at least a portion of the hollow interior space E, and in some embodiments, the entire hollow interior space E in the directions perpendicular to the longitudinal direction X.

Figure 2:
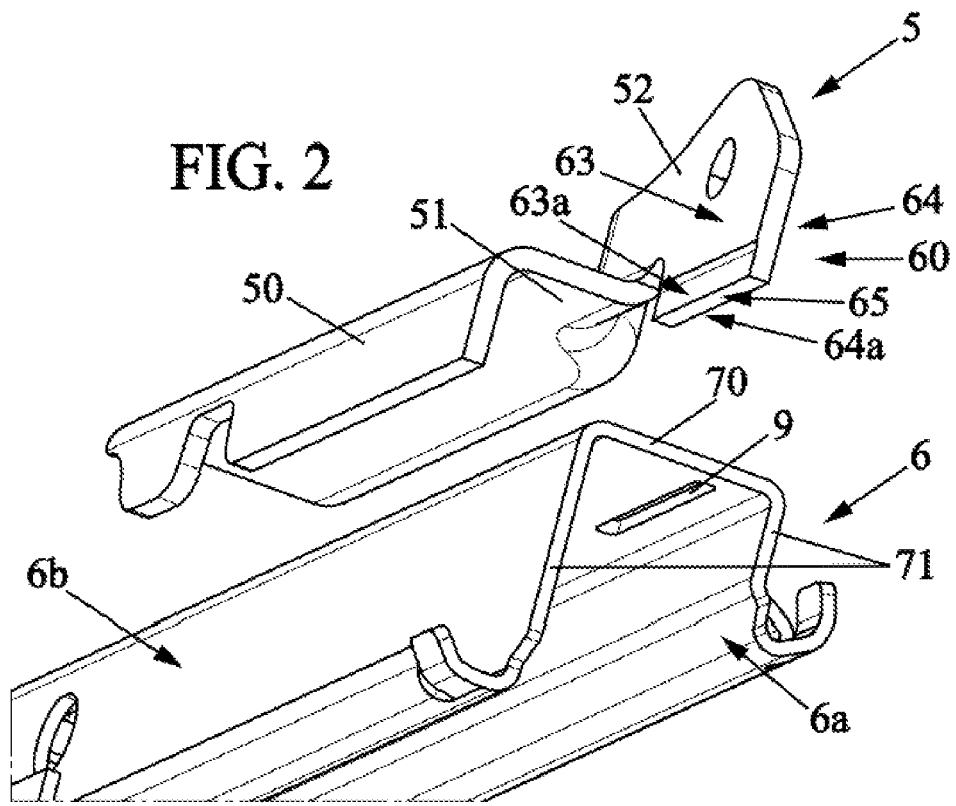
FIG. 2 is an exploded perspective view of a system according to a first embodiment of the invention.

As can be seen in FIG. 2, the movable rail 6 comprises a base 70 and two lateral flanges 71 one on either side of the base 70. The base 70 extends, for example, along the horizontal plane X, Y. The two lateral flanges of the movable rail 6 are arranged opposite one another relative to the base in the transverse direction Y.

The two lateral flanges 71 are, for example, substantially parallel to each other. The two lateral flanges 71 may extend perpendicularly to the base 70, substantially vertically downwards in a substantially vertical plane X, Z, for example perpendicular to the transverse direction Y and thus comprising the longitudinal direction X.

A vertical direction is thus defined as being substantially perpendicular to the transverse direction Y and to the longitudinal direction X The lateral flanges 71 ensure that the rails 6 and 7 fit together, are held in place, and slide properly.

The movable rail 6 may, for example, be made by folding a single sheet of metal.

As can be seen in FIG. 2, the support 5 is positioned above the movable rail 6 in the vertical direction Z.

The support 5 comprises a body 50 and a tongue 60 extending from the body 50.

More specifically, the body 50 is provided with a contact surface 51 extending along a substantially horizontal plane X, Y. The contact surface 51 is attached to the outer surface 6b of the movable rail 6.

To do so, it is possible for example to perform transmission welding through the base 70 of the movable rail 6.

The term "transmission welding" means in particular that the welding is performed on the side of the inner surface 6a of the movable rail but welds the contact surface 51 to the outer surface 6b through the thickness of the base of the movable rail 6.

Thus one or more welding beads 11 (shown in particular in FIG. 4) can attach the contact surface 51 to the outer surface 6b of the movable rail 6.

The body 50 comprises one or more lateral flanges 52 extending in a substantially vertical plane X, Z from the contact surface 51.

The lateral flange(s) 52 is (are) possibly provided with one or more holes 8a and 8b for the attachment of one or more external component(s). A first hole 8a, visible in FIG. 2, allows for example attaching the end of a seat belt (not shown). A second hole 8b, visible in the examples in FIGS. 5-9, allows for example attaching the seating part of the seat (not shown), directly or via a height adjustment device.

As illustrated in FIG. 2, the tongue 60 may for example extend from a lateral flange 52 of the body 50. The tongue 60 may extend from said at least one lateral flange 52 of the body 50 in a first portion 61 extending along the substantially vertical plane X, Z.

In addition, the movable rail 6 may include a through-window 9 as illustrated in FIG. 2.

In a first embodiment, illustrated in FIGS. 2, 3, 4A, and 4B, the window 9 is formed in the base 70 of the movable rail 6.

In a second embodiment, illustrated in FIG. 5, the window 9 is formed in a lateral flange 71 of the movable rail 6.

Finally, in a third embodiment, illustrated in FIGS. 6, 7, 8A, and 8B, an edge connecting a lateral flange (71) of the movable rail (6) to the base (70) of the movable rail (6).

In three embodiments, the tongue 60 extends from the body 50 through the window 9 of the movable rail 6.

The tongue 60 is then attached to the inner surface 6a of the movable rail 6.

More specifically, the tongue 60 may extend between two main extension faces 63, 64. The two main extension faces 63, 64 are separated by the thickness of the tongue D.

The main extension faces 63, 64 are, for example, substantially parallel to each other and aligned in particular in the longitudinal direction X.

The tongue 60 is thus for example made by folding a single sheet, in particular by folding and cutting out a portion of the metal sheet constituting the support 5.

"Thickness D of the tongue" is thus understood to mean a minimum distance between the main extension faces 63, 64 at a point of the tongue 60, a particular a point on one of the main extension faces 63 of the tongue 60. This minimum distance is, for example, measured between said main extension faces 63, 64 perpendicularly to the longitudinal direction X.

When said minimum distance varies depending on what point of the tongue 60 is chosen (in other words, when the tongue 60 does not have a constant thickness all along its length), the term "thickness D of the tongue" is understood to mean the maximum thickness of the tongue 60 among said thicknesses measured at each point of the tongue 60.

End faces, of smaller dimensions, may connect the two main extension faces 63, 64 at the sides of the tongue.

Thus in particular, the tongue 60 may terminate in at least one end face 65 connecting the two main extension faces 63, 64, in particular connecting said main extension faces at one end of the tongue 60 as will now be detailed. The tongue 60 thus extends the body 50 of the support 5 to the end face 65.

In one embodiment not shown in the figures, the tongue 60 may comprise a non-planar end, for example an angled end. In such an embodiment, the tongue 60 will then present a plurality of end faces 62.

As represented in FIG. 3, once the system is assembled, the tongue 60 is inserted through the window 9.

The tongue 60 is inserted in particular through the window 9 so that the end face 65 is arranged either within the thickness of the movable rail 6, in other words between the outer surface 6b and inner surface 6a of the rail, or within the hollow interior space E of the track, in other words entirely traversing the thickness of the movable rail 6, or partially within the thickness of the movable rail 6 and/or within the hollow interior space E.

In particular, when the system is assembled, the tongue 60 has a maximum extension into the hollow interior space E, measured in a plane perpendicular to the longitudinal direction X, that is less than or equal to a thickness D of the tongue 60, measured in a plane perpendicular to the longitudinal direction X.

"Maximum extension into the hollow interior space E" is understood to mean a maximum distance, measured in a plane perpendicular to the longitudinal direction X, between an end of the tongue 60, in particular a point on the end face 65 of the tongue 60, and the opening of the window 9 in the inner surface 6a of the movable rail 6, in particular a point on the edge of the window 9 at the inner surface 6a of the movable rail 6.

Moreover, the tongue 60 is attached to the inner surface 6a of the movable rail 6 for example by means of welds 10.

More specifically, the tongue 60 is attached to the inner surface 6a of the movable rail 6 by one or more laser welding beads 10 each of which overlap the tongue 60 and the inner surface 6a of the movable rail 6.

We firstly refer to the first embodiment, represented in FIG. 3, in which the window 9 is formed in the base of the movable rail 6.

As illustrated in FIG. 3, in this embodiment a laser welding bead 10 covers at least a portion of the end face 65 of the tongue 60.

The end face 65 of the tongue 60 is connected respectively to the two main extension faces 63, 64 by two respective end edges 63a, 64a.

The end edges 63a, 64a form, for example, angles substantially near 90 degrees. In FIGS. 3, 4A, and 4B, the end edges 63a, 64a extend along the end of the tongue 60 in the longitudinal direction X.

In the example of FIGS. 3, 4A, and 4B, at least two laser welding beads 10a, 10b overlap the tongue 60 and the inner surface 6a of the movable rail 6. The laser welding beads 10a, 10b respectively cover at least a portion of each respective end edge 63a, 64a.

The laser welding beads 10a, 10b extend for example along the longitudinal direction X.

In a first variant of the first embodiment, illustrated in FIG. 3, three laser welding beads 10a, 10b, 10c overlap the tongue 60 and the inner surface 6a of the movable rail 6. The laser welding beads 10a, 10b, 10c are arranged so as to alternate in the longitudinal direction along one or the other of the two end edges 63a, 64a.

In a second variant of the first embodiment, illustrated in FIG. 4A, four laser welding beads 10a, 10b, 10c, 10d overlap the tongue 60 and the inner surface 6a of the movable rail 6 at the two end edges 63a, 64a. The laser welding beads 10a, 10b, 10c, 10d are respectively placed at the four corners of the end face 65 of the tongue 60.

In a third variant of the first embodiment, illustrated in FIG. 4B, the welding bead 10 is a zig-zag weld 10 which overlaps the tongue 60 and the inner surface 6a of the movable rail 6. The welding bead 10e runs, for example lengthwise for comprehension purposes, in the longitudinal direction X and, for example widthwise again for comprehension purposes, in a second direction perpendicular to the longitudinal direction X. The second direction may be for example the transverse direction Y or the vertical direction Z depending on whether the window 9 is formed in the base 70 or in a lateral flange 71 of the movable rail 6. Thus, in the example of FIG. 4B, the second direction is the transverse direction Y.

The welding bead 10e completely traverses the end face 65 in the second direction (Y in the example of FIG. 4B) in order to cover the respective portions 81, 82 of the inner surface 6a of the movable rail 6 which are located on either side of the window 9 along said second direction, in particular one on either side, along said second direction, of the opening of the window 9 in the inner surface of the movable rail 6.

A "zig-zag" shape of the welding bead 10e is understood to mean that the welding bead comprises a number of rectilinear segments weld bead arranged contiguously one after another in a plane formed by the longitudinal direction X and the second direction, so as to form respective angles to their direction of extension, particularly alternate angles. In this manner, the welding bead 10e extends generally in an average direction that is close to the longitudinal direction X with some lateral extension in the second direction about the average direction, said average extension being sufficient to traverse the end face 65 completely in the second direction and to cover said respective portions 81, 82 of the inner surface 6a of the movable rail 6 which are located one on either side of the window 9 along the second direction.

FIG. 5 illustrates a second embodiment of the invention in which the window 9 is formed in a lateral flange 71 of the movable rail 6.

In this embodiment, it is simple to adjust the transverse position of the support 5 relative to the slide track within a certain range during assembly, by moving the support relative to the movable rail in the transverse direction Y.

In this second embodiment, the tongue 60 terminates in an end portion 65 extending in the substantially horizontal plane X, Y. The end portion 65 terminates for example in the end face(s) 62 detailed above.

Depending on the position adopted for the support 5 relative to the movable rail 6, a laser welding bead 10f can then cover a portion of one of the main extension faces 63, 64 of the tongue 60 and a portion of the inner surface 6a of the movable rail 6. Thus, for ease of manufacture of the system according to the invention, the welding bead 10f may be arranged to cover a portion of the downward-facing main extension face 63, meaning the main extension face 63 which faces the fixed rail 7.

In a variant of this embodiment, the laser welding bead may be arranged to cover a portion of the end face 65 of the tongue 60 as detailed above.

We now refer to FIGS. 6, 7, 8A, and 8B which illustrate three variants of a third embodiment of the invention, wherein the window 9 is formed in an edge connecting a lateral flange 71 of the movable rail 6 to the base 70 of the movable rail 6.

Figure 6:
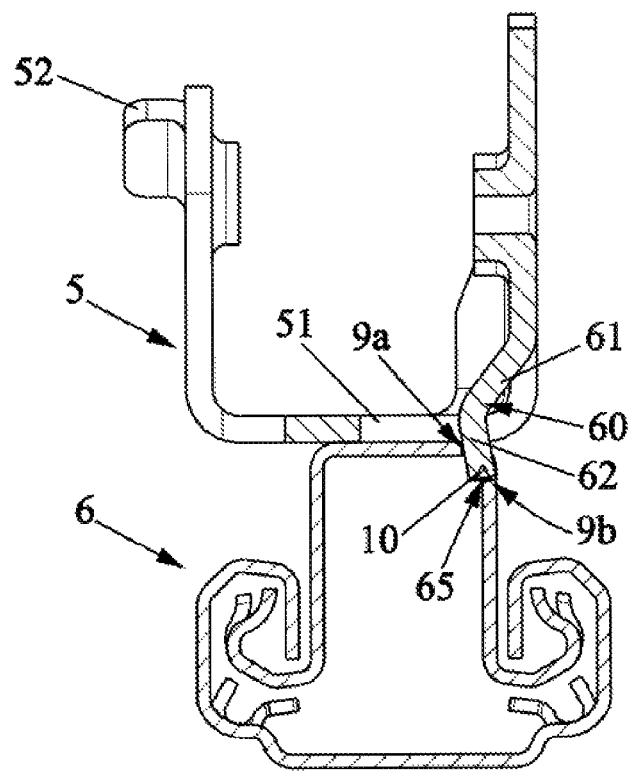
FIG. 6 is a vertical cross-sectional view of a system according to a third embodiment of the invention.

Referring firstly to FIG. 6, in this third embodiment the window 9 is placed in an edge connecting a lateral flange 71 of the movable rail 6 to the base 70 of the movable rail 6. The window 9 is thus in a plane perpendicular to the longitudinal direction X, a first side 9a of the window being part of the base 70 of the movable rail 6 and a second side 9b being part of the lateral flange 71 of the movable rail 6.

In the first variant of this third embodiment, illustrated in FIG. 6, the tongue 60 has an end portion 65 which extends substantially in the vertical plane X, Z.

"Substantially in the vertical plane X, Z" is understood to mean that it lies in this vertical plane or in a plane forming a small angle with the vertical plane, for example an angle of less than 30 degrees.

The tongue 60 terminates in the end face 65 already described above.

In the variant in FIG. 6, the end face 65 abuts against the second side 9b of the window 9 that is part of the lateral flange 71 of the movable rail 6.

A welding bead 10a is then placed so as to overlap the end face 65 and the second side 9b of the window 9.

In this variant, one of the main extension faces 64 of the end portion 65 is in contact with the first side 9a of the window 9.

A welding bead 10b may also be arranged to overlap the first side 9a of the window 9 and said main extension face 64.

Figure 7:
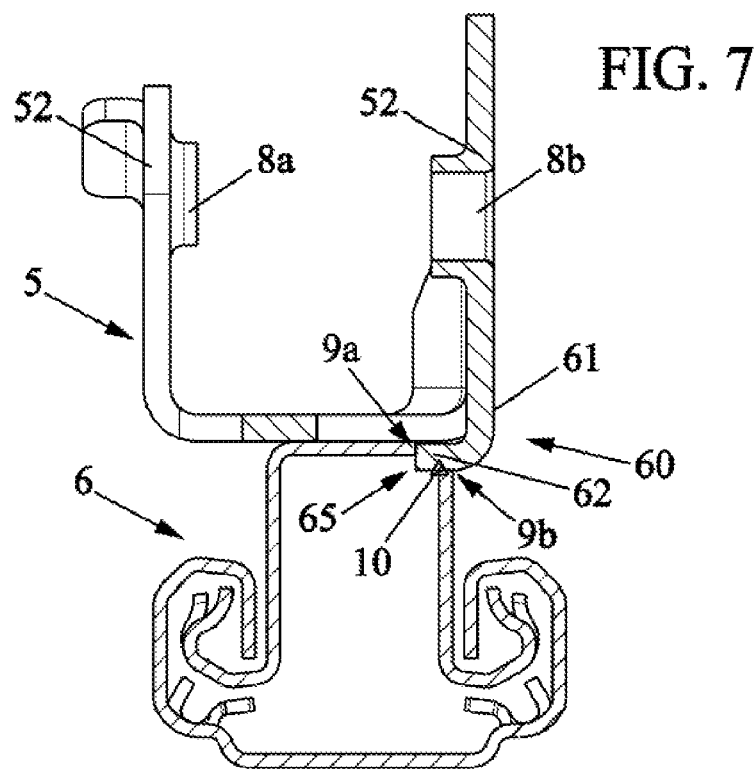
FIG. 7 is a vertical cross-sectional view of a first variant of the system according to the third embodiment of the invention.

FIG. 7 illustrates a second variant of this third embodiment, in which the end portion 65 of the tongue 60 extends substantially in the horizontal plane X, Y.

"Substantially in the horizontal plane X, Y" again is understood to mean it lies in this horizontal plane or in a plane forming a small angle with the horizontal plane, for example an angle of less than 30 degrees.

The tongue 60 terminates in the end face 65 already described above.

In the variant of FIG. 7, the end face 65 abuts against the first side 9a of the window 9 which is part of the base 70 of the movable rail 6.

A welding bead 10a is then placed so as to overlap the end face 65 and the first side 9a of the window 9.

In this variant, one of the main extension faces 63 of the end portion 65 is in contact with the second side 9b of the window 9.

A welding bead 10b may also be arranged to overlap the second side 9b of the window 9 and said main extension face 63.

Figure 8A:
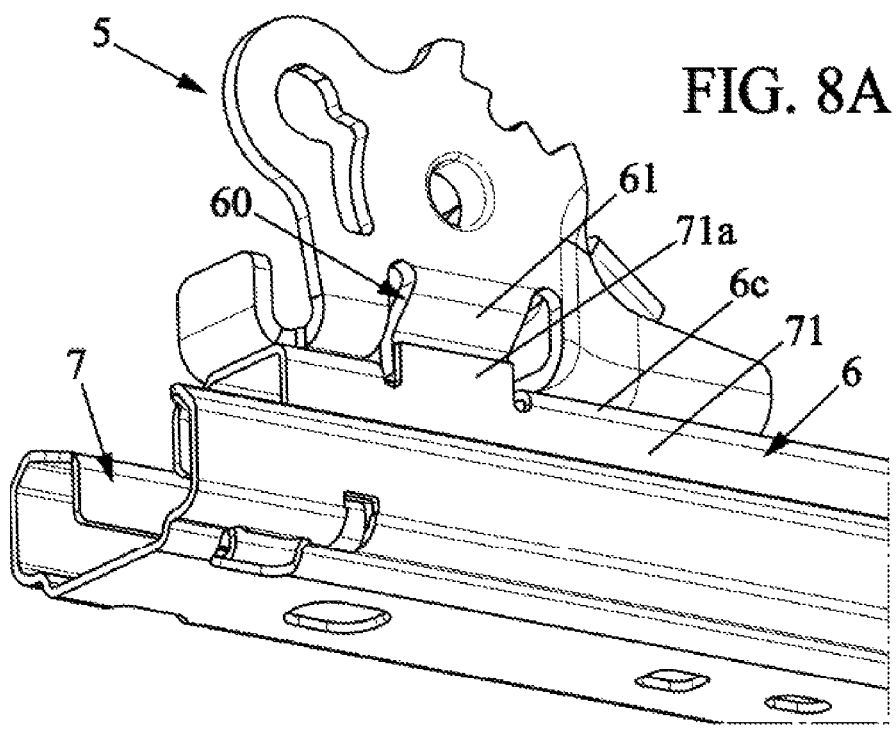
FIG. 8A is a perspective view of a second variant of the system according to the third embodiment of the invention.
Figure 8B:
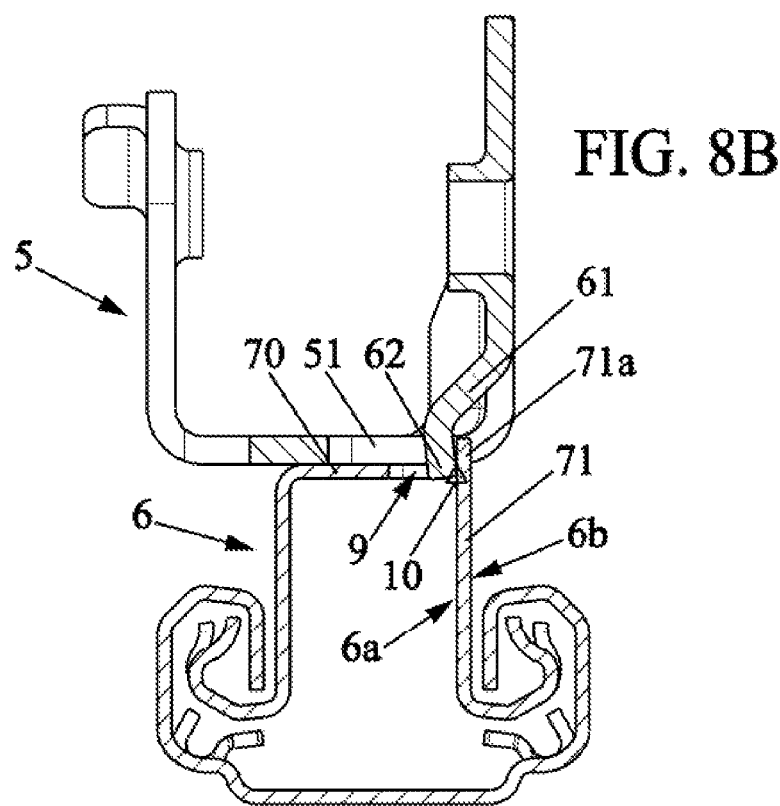
FIG. 8B is a vertical cross-sectional view of the system of FIG. 8A.

Finally, FIGS. 8A and 8B illustrate a third variant of this third embodiment. In this third variant, the lateral flange 71 is extended by an extending tab 71a.

More specifically, as illustrated in FIG. 8A, the window 9 is at least partially delimited by said extending tab 71a of the lateral flange 71. More specifically, the extending tab 71a forms the second side 9b of the window 9 in the lateral flange 71 of the movable rail 6, as described above.

The extending tab 71a thus extends through the window 9 as an extension of the lateral flange 71.

In this embodiment, the tongue 60 has an end portion 65 which lies substantially in the vertical plane X, Z.

The tongue 60 is attached to the movable rail 6 at the location of said extending tab 71a. The tongue 60 is thus attached by a welding bead 10a placed so as to overlap one of the main extension faces 64 of the end portion 65 and the extending tab 71a of the lateral flange 71.

Attachment by laser welding can thus be internal-to-external.

Of course, the laser welding beads can also be accompanied by attachment via gluing, clinching, crimping, riveting, or any other means of attachment known to those skilled in the art.

A method for manufacturing a system according to the invention may be schematically as follows.

After procuring a slide track comprising a fixed rail and a movable rail and a support comprising a body and a tongue, a window is formed in the movable rail that is adapted to allow the passage of the tongue during a first step.

A second step consists of inserting the tongue of the support into the opening.

Finally, a third step consists of attaching the tongue to the movable rail.

The invention claimed is:

1. A system comprising:
   a slide track for motor vehicle seat, and
   a support,
   the slide track comprising a fixed rail intended to be mounted on the chassis of the motor vehicle, and a movable rail adapted to slide relative to the fixed rail in a longitudinal direction, the movable rail having:
   an inner surface defining a portion of a hollow interior space E arranged between the movable rail and the fixed rail,
   an outer surface separated from the inner surface by the thickness of the wall of the movable rail, and
   a through-window, the support comprising:
- a body having a contact surface extending in a substantially horizontal plane and attached to the outer surface of the movable rail, and
- a tongue extending from the body to pass through the window of the movable rail and be attached to the inner surface of the movable rail, wherein the tongue also extends in thickness between two main extension faces,
wherein the tongue has a maximum distance between an end of the tongue and an opening of the through-window in the inner surface of the movable rail, measured in a plane perpendicular to the longitudinal direction, that is less than or equal to a minimum distance between the main extension faces at a point of the tongue measured in a plane perpendicular to the longitudinal direction,
wherein the tongue is attached to the inner surface of the movable rail by at least one laser welding bead overlapping the tongue and the inner surface of the movable rail.

2. The system according to claim 1, wherein the body of the support comprises at least one lateral flange extending substantially in a vertical plane from the contact surface, and wherein the tongue extends from said at least one lateral flange of the body.

3. The system according to claim 2, wherein the tongue extends from said at least one lateral flange of the body in a first portion extending substantially in the vertical plane.

4. The system according to claim 1, wherein the tongue terminates in an end portion extending substantially in the horizontal plane.

5. The system according to claim 1, wherein said at least one laser welding bead covers at least a portion of a main extension face of the tongue.

6. The system according to claim 1, wherein the tongue terminates in at least one end face connecting the two main extension faces, and wherein said at least one laser welding bead covers at least a portion of the end face of the tongue.

7. The system according to claim 6, wherein the end face of the tongue is respectively connected to the two main extension faces by two respective end edges, and wherein at least two laser welding beads overlap the tongue and the inner surface of the movable rail and respectively cover at least a portion of each respective end edge.

8. The system according to claim 6, wherein a welding bead is a zig-zag welding bead extending in the longitudinal direction and in a second direction perpendicular to the longitudinal direction and completely traversing the end face in the second direction so as to cover respective portions of the inner surface of the movable rail which are arranged one on either side of the window in said second direction.

9. The system according to claim 1, wherein the movable rail comprises a base extending along the horizontal plane, with two lateral flanges one on either side of the base, and wherein the window is formed in an edge connecting a lateral flange of the movable rail to the base of the movable rail.

10. The system according to claim 9, wherein the window formed in said edge connecting a lateral flange of the movable rail to the base of the movable rail is at least partially defined by a tab extending from the lateral flange through the window as an extension of said lateral flange, and wherein the tongue is attached to said extending tab.

11. A motor vehicle seat comprising a system, the system comprising:
a slide track, and
a support,
the slide track comprising a fixed rail intended to be mounted on the chassis of the motor vehicle, and a movable rail adapted to slide relative to the fixed rail in a longitudinal direction, the movable rail having:
an inner surface defining a portion of a hollow interior space E arranged between the movable rail and the fixed rail,
an outer surface separated from the inner surface by the thickness of the wall of the movable rail, and
a through-window,
the support comprising:
a body having a contact surface extending in a substantially horizontal plane and attached to the outer surface of the movable rail, and
a tongue extending from the body to pass through the window of the movable rail and be attached to the inner surface of the movable rail, wherein the tongue also extends in thickness between two main extension faces,
wherein the tongue has a maximum distance between an end of the tongue and an opening of the through window in the inner surface of the movable rail, measured in a plane perpendicular to the longitudinal direction, that is less than or equal to a minimum distance between the main extension faces at a point of the tongue measured in a plane perpendicular to the longitudinal direction,
wherein the tongue is attached to the inner surface of the movable rail by at least one laser welding bead overlapping the tongue and the inner surface of the movable rail.

12. A system comprising:
a slide track for a motor vehicle seat, and
a support,
the slide track comprising a fixed rail intended to be mounted on the chassis of a motor vehicle, and a movable rail adapted to slide relative to the fixed rail in a longitudinal direction, the movable rail having:
an inner surface defining a portion of a hollow interior space arranged between the movable rail and the fixed rail,
an outer surface separated from the inner surface by a thickness of a wall of the movable rail, and
a window formed through the wall,
the support comprising:
a body having a contact surface extending in a substantially horizontal plane and attached to the outer surface of the movable rail, and
a tongue extending from the body to pass through the window of the movable rail and be attached to the inner surface of the movable rail, the tongue having two main extension faces separated by a tongue thickness and a maximum extension into the hollow interior space that is less than or equal to the tongue thickness,
wherein the tongue is attached to the inner surface of the movable rail by at least onelaser welding bead overlapping the tongue and the inner surface of the movable rail.

* * * * *